United States Patent [19]

Sanders, Jr. et al.

[11] Patent Number: 5,000,763
[45] Date of Patent: Mar. 19, 1991

[54] PROCESS FOR SEPARATING HYDROGEN FROM GAS MIXTURES USING A SEMI-PERMEABLE MEMBRANE CONSISTING PREDOMINANTLY OF POLYCARBONATES DERIVED FROM TETRAHALOBISPHENOLS

[75] Inventors: Edgar S. Sanders, Jr., Pittsburg; Dana C. Overman, III, Vallejo, both of Calif.

[73] Assignee: The Dow Chemical Company, Midland, Mich.

[21] Appl. No.: 366,005

[22] Filed: Jun. 14, 1989

[51] Int. Cl.$^5$ .................... B01D 53/22; B01D 71/50
[52] U.S. Cl. ............................ 55/16; 55/68
[58] Field of Search ............... 55/16, 68, 158

[56] References Cited

U.S. PATENT DOCUMENTS

| | | | |
|---|---|---|---|
| 3,119,787 | 1/1964 | Laasko et al. | 55/16 X |
| 3,246,450 | 4/1966 | Stern et al. | 55/16 |
| 3,256,675 | 6/1966 | Robb | 55/16 |
| 3,615,024 | 10/1971 | Michaels | 210/490 |
| 3,890,266 | 6/1975 | Serini et al. | |
| 3,945,926 | 3/1976 | Kesting | 264/41 X |
| 4,032,309 | 6/1977 | Salemme | 55/158 |
| 4,075,108 | 2/1978 | Highley et al. | 264/41 X |
| 4,086,310 | 4/1978 | Bottenbruch et al. | 264/41 |
| 4,172,885 | 10/1979 | Perry | 55/16 X |
| 4,180,552 | 12/1979 | Graham et al. | 55/16 X |
| 4,180,553 | 12/1979 | Null et al. | 55/16 X |
| 4,181,675 | 1/1980 | Makin et al. | 55/16 X |
| 4,195,157 | 3/1980 | Mark | 528/174 |
| 4,230,463 | 10/1980 | Henis et al. | 55/16 |
| 4,238,204 | 12/1980 | Perry | 55/16 |
| 4,374,891 | 2/1983 | Ward, III | 428/220 |
| 4,764,320 | 8/1988 | Chau et al. | 55/158 X |
| 4,772,392 | 9/1988 | Sanders et al. | 210/500.23 |
| 4,840,646 | 6/1989 | Anand et al. | 55/16 |
| 4,851,014 | 7/1989 | Jeanes | 55/16 |

FOREIGN PATENT DOCUMENTS

| | | |
|---|---|---|
| 136621 | 4/1985 | European Pat. Off. . |
| 0242147 | 10/1987 | European Pat. Off. ............ 55/158 |
| 53-16373 | 7/1976 | Japan . |
| 53-066880 | 6/1978 | Japan .................... 55/158 |
| 56-107351 | 7/1981 | Japan . |
| 58-223411 | 6/1982 | Japan . |
| 58-008506 | 1/1983 | Japan .................... 55/158 |
| 58-008511 | 1/1983 | Japan .................... 55/158 |
| 59-22724 | 2/1984 | Japan . |
| 59-120206 | 7/1984 | Japan .................... 55/158 |
| 59-177120 | 10/1984 | Japan .................... 55/16 |
| 529183 | 9/1976 | U.S.S.R. . |
| 2011804A | 11/1978 | United Kingdom . |

OTHER PUBLICATIONS

Barbari et al., "Polymeric Membranes Based on Bisphenol A for Gas Separations", *Journal of Membranes Science*, vol. 42, 1989, pp. 69–86.

Muruganandam, U/Texas at Austin, Separations Res. Program, paper presented at fall mtg. Oct. 28–29, 1985, "Absorption and Transport in Substituted Polycarbonates and Polystyrene/Tetramethyl Polycarbonate Blends".

Muruganandam, "Evaluation of Substituted Polycarbonates and a Blend with Polystyrene as Gas Separation Membranes", *Journal of Membrane Science*, vol. 34, 1987, pp. 185–198.

Chern et al., Chapter 2 "Material Selection for Membrane Based Gas Separations", *Material Science of Synthetic Membranes*, Lloyd, Ed. p. 25–46, American Chemical Society (1985).

*Primary Examiner*—Robert Spitzer

[57] ABSTRACT

The invention is a process for separating hydrogen from gas mixtures using a semi-permeable membrane consisting predominantly of polycarbonates derived from tetrahalobisphenols such as tetrabromobisphenol.

22 Claims, No Drawings

PROCESS FOR SEPARATING HYDROGEN FROM GAS MIXTURES USING A SEMI-PERMEABLE MEMBRANE CONSISTING PREDOMINANTLY OF POLYCARBONATES DERIVED FROM TETRAHALOBISPHENOLS

BACKGROUND OF THE INVENTION

This invention relates to a process for separating hydrogen from gas mixtures using a semi-permeable membrane derived from polycarbonate wherein the polycarbonate is derived in a significant portion from tetrahalobisphenols.

In various industries, it is necessary or highly desirable to separate one component from another in a gaseous stream. Processes used to perform such separations include cryogenics, pressure swing adsorption, chemical absorption, and membrane separations.

Membranes have been used to recover or isolate a variety of gases, including hydrogen, helium, oxygen, nitrogen, carbon monoxide, carbon dioxide, water vapor, hydrogen sulfide, ammonia, and light hydrocarbons. Applications of particular interest include the separation of hydrogen from gas mixtures such as mixtures containing nitrogen, carbon monoxide, carbon dioxide, and/or light hydrocarbons. For example, the separation and use of hydrogen is often necessary in various hydrocracker, hydrotreater, and catalytic cracking processes used in the oil refinery industry. Membranes can be used to achieve such separations.

Such membrane separations are based on the relative permeability of two or more gaseous components through the membrane. To separate a gas mixture into two portions, one richer and one leaner in at least one component, the mixture is brought into contact with one side of a semi-permeable membrane through which at least one of the gaseous components selectively permeates. A gaseous component which selectively permeates through the membrane passes through the membrane more rapidly than at least one other component of the mixture. The gas mixture is thereby separated into a stream which is enriched in the selectively permeating component or components and a stream which is depleted in the selectively permeating component or components. The stream which is depleted in the selectively permeating component or components is enriched in the relatively non-permeating component or components. A relatively non-permeating component permeates more slowly through the membrane than at least one other component of the mixture. An appropriate membrane material is chosen for the mixture so that some degree of separation of the gas mixture can be achieved.

Membranes for hydrogen separation have been fabricated from a wide variety of polymeric materials, including cellulose esters, polyimides, polyaramides, and polysulfones. An ideal gas separation membrane is characterized by the ability to operate under high temperature and/or pressure while possessing a high separation factor (selectivity) and high gas permeability. The problem is finding membrane materials which possess all the desired characteristics. Polymers possessing high separation factors generally have low gas permeabilities, while those polymers possessing high gas permeabilities generally have low separation factors. In the past, a choice between a high separation factor and a high gas permeability has been unavoidably necessary. Furthermore, some of the membrane materials previously used suffer from the disadvantage of poor performance under high operating temperatures and pressures. A membrane capable of separating hydrogen from light hydrocarbons which possesses high selectivity, high gas permeability, and ability to operate under extreme conditions of temperature and pressure is needed.

SUMMARY OF THE INVENTION

The invention is a process of separating hydrogen from gas mixtures comprising:

(A) contacting one side of a semi-permeable membrane with a feed gas mixture containing hydrogen under pressure, wherein the membrane divides a separation chamber into a higher pressure side into which the feed gas mixture is fed and a lower pressure side;

(B) maintaining a pressure differential across the membrane under conditions such that hydrogen selectively permeates through the membrane from the high pressure side to the low pressure side of the membrane:

(C) removing from the low pressure side of the membrane permeated gas which is enriched in hydrogen; and (D) removing from the high pressure side of the membrane non-permeated gas which is depleted in hydrogen:

wherein the membrane comprises a thin discriminating layer comprising a polycarbonate polymer derived from a bisphenol corresponding to Formula I:

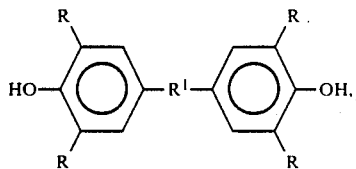

Formula I wherein R at each occurrence is independently hydrogen, chlorine, bromine, or $C_{1-4}$ alkyl, and $R^1$ is —CO—, —S—, —SO$_2$—, —O—, a $C_{1-6}$ divalent hydrocarbon radical, a $C_{1-6}$ divalent fluorocarbon radical, or an inertly substituted $C_{1-6}$ divalent hydrocarbon radical, with the proviso that at least about 25 weight percent of the moieties derived from the bisphenol of Formula I present in the discriminating layer bear R groups which are exclusively bromine, chlorine, or mixtures thereof.

The membranes used in this invention demonstrate surprisingly high separation factors and high permeabilities for the separation of hydrogen from gas mixtures. Furthermore, the membranes used in this invention possess good mechanical properties and therefore are useful under more extreme conditions, for example, temperature and pressure.

DETAILED DESCRIPTION OF THE INVENTION

The membranes used in this invention are prepared from polycarbonates derived from bisphenols wherein a significant portion of the bisphenols used to prepare the polycarbonates are tetrahalo-substituted: more preferably, the tetrahalo-substituents are found in the 3,5-positions on the aromatic or phenolic rings. The presence of a significant portion of the residue of tetrahalobisphenols enhances the separation properties of membranes that are prepared therefrom.

Preferably, at least about 35 weight percent of the moieties derived from the bisphenol of Formula I present in the discriminating layer bear R groups which are exclusively bromine, chlorine, or mixtures thereof. More preferably, at least about 50 weight percent of the moieties derived from the bisphenol of Formula I present in the discriminating layer bear R groups which are exclusively bromine, chlorine, or mixtures thereof. Even more preferably, at least about 75 weight percent of the moieties derived from the bisphenol of Formula I present in the discriminating layer bear R groups which are exclusively bromine, chlorine, or mixtures thereof. Even more preferably, the polycarbonate is derived from bisphenols of Formula I, wherein R is exclusively bromine, chlorine, or mixtures thereof. In the embodiment wherein the polycarbonate is prepared from tetrachlorobisphenols, it is preferable that the polycarbonate backbone contains about 90 percent by weight or greater units derived from tetrachlorobisphenols, more preferably 95 percent by weight, and most preferably 100 percent by weight. Bromine is the preferred halogen herein. Examples of preferred bisphenols of Formula I which bear R groups which are exclusively bromine or chlorine are 2,2-bis-(3,5-bromo-4-hydroxyphenyl)propane and 2,2bis(3,5-chloro-4-hydryoxyphenyl)propane, with 2,2-bis(3,5-bromo-4-hydroxyphenyl)propane being most preferred.

The polycarbonates used in this invention preferably correspond to Formula II:

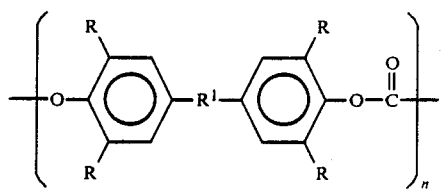

Formula II wherein R and $R^1$ are as hereinbefore defined and n is an integer of about 50 or greater. Preferably, the polycarbonates of this invention are derived from between about 25 and about 100 weight percent of a bisphenol corresponding to Formula III:

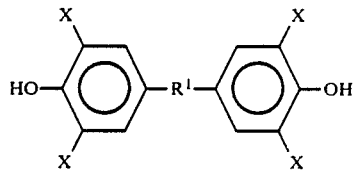

Formula III and between about 0 and about 75 weight percent of a bisphenol corresponding to Formula IV:

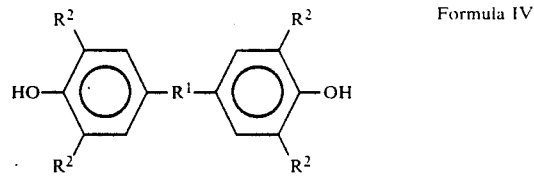

Formula IV wherein $R^1$ is as hereinbefore defined, $R^2$ is hydrogen or $C_{1-4}$ alkyl, and X is independently in each occurrence chlorine or bromine. Preferably, the polycarbonate is derived from between about 35 and about 100 weight percent of a bisphenol of Formula III and between about 0 and about 65 weight percent of a bisphenol of Formula IV; even more preferably between about 0 and about 50 weight percent of a bisphenol of Formula IV, and about 50 and about 100 weight percent of a bisphenol of Formula III. Even more preferably, the polycarbonate is derived from between about 75 and about 100 weight percent of a bisphenol corresponding to Formula III and between about 0 and about 25 weight percent of a bisphenol corresponding to Formula IV.

In a most preferred embodiment, the polycarbonate is derived exclusively from bisphenols corresponding to Formula III. Examples of bisphenols within the scope of Formula IV include 2,2-bis(4-hydroxyphenyl)propane, 2,2-bis(3,5-methyl-4-hydroxyphenyl)propane, and the like.

The polymers prepared from bisphenols of Formula III and Formula IV preferably have recurring units which correspond to Formula V:

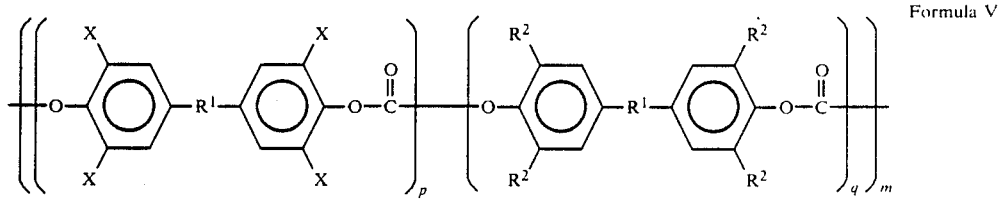

Formula V wherein $R^1$, $R^2$, and X are as hereinbefore defined, p is a number between about 15 and about 100, q is a number between about 0 and about 85, and m is a positive real number, such that the polymer the formula represents possesses sufficient molecular weight to prepare a membrane with suitable characteristics.

In the embodiment wherein the polycarbonate of this invention is derived from bisphenols which correspond both to Formula III and to Formula IV, $R^2$ is preferably $C_{1-4}$ alkyl, most preferably methyl. In a more preferred embodiment, the polycarbonate used to prepare membranes in this invention is a copolymer of 2,2-bis(3,5-dibromo-4-hydroxyphenyl)propane and 2,2'-bis-(3,5-dimethyl-4-hydroxyphenyl)propane.

In the hereinbefore presented formulas, R is preferably chlorine, bromine or $C_{1-4}$ alkyl, more preferably chlorine, bromine or methyl, even more preferably chlorine and bromine, and most preferably bromine. $R^1$ is preferably a $C_{1-6}$ divalent hydrocarbon radical, more preferably a $C_{1-6}$ alkylidene radical, even more preferably a propylidene radical. The polycarbonates of this invention can be prepared by any process known in the art which prepares polycarbonates with suitable properties for membrane formation. See *Encyclopedia of Polymer Science & Technology*, Editor Mark et al., Interscience Division of John Wiley & Sons, N.Y., N.Y., 1969, Vol. 10, pp. 714–725, the relevant portions incorporated herein by reference. The polymers of this invention should be polymerized to the extent that the polymers will form a membrane with sufficient mechanical strength to withstand use conditions. Preferably, the polymer possesses an inherent viscosity of about 0.35 or greater and more preferably of about 0.40 or greater. The polymer preferably possesses a molecular weight of about 60,000 or greater.

The membranes useful in this invention can take any form known to one skilled in the art. In particular, the membrane may be a homogeneous membrane, a composite membrane, or an asymmetric membrane. Furthermore, the membranes may be in the form of a flat sheet, a hollow tube, or a hollow fiber. One skilled in the art would readily know how to prepare a membrane in any of the aforementioned forms. As used herein, the term semi-permeable membrane refers to a membrane which displays different permeabilities for different species of molecules, and therefore may be used in the separation of species of molecules possessing different permeabilities across the membrane. Permeate as used herein refers to those species which permeate through the membrane at a faster rate than other species. Non-permeate refers herein to those species which permeate at a slower rate than the other species present.

Preferably, the membranes useful in this invention are asymmetric or composite membranes, most preferably asymmetric membranes.

Homogeneous and composite membranes are prepared by forming a thin discriminating layer which is dense and free of voids and pores. Such membranes or layers have generally the same structure and composition throughout the membrane. In one preferred embodiment, the polycarbonates useful in this invention are dissolved in a solvent, for example, methylene chloride, chloroform, dimethylformamide, N-methylpyrrolidinone, or dimethylacetamide. Preferably, the solution contains polymer in weight percents between about 5 and about 75, more preferably between about 10 and about 40, and most preferably between about 15 and about 20. This solution should possess sufficient viscosity to allow casting of the solution onto a uniform surface and should be homogeneous. The polymer is cast on a surface, and in the case of a homogeneous membrane, on a surface from which the finished membrane may readily be separated. A convenient way of carrying out this operation is either by casting the membrane solution onto a support surface which may be dissolved away from the finished membrane following the drying and curing steps, or by casting the membrane onto a support having low surface energy, such as silicone, coated glass, a surface to which the membrane will not adhere, such as mercury, or a liquid with which the polymer is substantially immiscible, such as water. Casting is performed by pouring the solution onto the appropriate surface and using an appropriate tool to form a solution of the appropriate thickness. A continuous casting process may be achieved by casting the solution onto endless belts or rotating drums. Thereafter, the cast solution is exposed to drying or curing conditions. Such conditions are used to remove the solvent thereby leaving a thin discriminating layer of polymer which is homogeneous. The solution may be dried either by exposure to a vacuum, exposure to elevated temperatures, by allowing the solvent to evaporate over time, or any combination thereof. Generally, it is preferable to expose the cast solution to elevated temperatures, preferably less than about 300° C., more preferably less than about 200° C. In one preferred embodiment, such exposure is done in a vacuum oven or under vacuum conditions at elevated temperatures. Preferably, the homogeneous membrane has a thickness of between about 0.5 (12.7 microns) and about 10.0 mils (254 microns), and most preferably between about 0.5 (12.7 microns) and about 3 mils (76.2 microns).

To prepare a composite membrane, a homogeneous, thin discriminating layer can be formed and thereafter adhered to a porous support after formation. Alternatively, the porous support can be the surface upon which the membrane is cast. In such embodiment, the composite membrane is prepared by casting a forming solution as a uniform coating on the porous support which forms the support layer for the finished membrane. Penetration of the polymer from which the thin discriminating layer is formed into pores of the porous supporting layer is acceptable so long as the desired thickness of the semi-permeable membrane is not exceeded. In a composite membrane, the membrane is supported on a porous substrate or structure. This porous supporting layer is characterized in that it does not greatly impede the transport across this layer of all components of a fluid in contact with the porous layer. The porous supporting layer can comprise a discriminating layer which impedes the transportation of some fluid components to the discriminating layer, but generally this type of discriminating layer is not necessary or desirable In one embodiment, the supporting layer can be a metal or polymeric plate with a plurality of holes drilled through it. However, such a drill plate is not advantageous because it can significantly reduce the effective area of the membrane. In a preferred embodiment, the porous supporting layer is a porous polymer membrane. Illustrative of such polymeric supporting layers are cellulose ester and microporous polysulfone membranes. Such membranes are commercially available under the trade names MILLIPORE, PELLICON, and DIAFLOW. Where such supporting membranes are thin or highly deformable, a frame or screen may also be necessary to adequately support the semi-permeable membrane. In one especially preferred embodiment, the polymeric supporting layer is a hollow fiber of a microporous polymer such as polysulfone, cellulose acetate, or some other cellulose ester. The hollow fiber itself provides adequate support for the semi-permeable membrane layer coated on the inside or outside surface of the fiber. Polysulfone hollow fibers are most preferred for this application. After the solution useful in forming the thin discriminating layer is cast on the porous support, the porous support and solution cast thereon are then exposed to conditions for removal of the solvent so as to form the dense skin. Such conditions are similar to those described hereinbefore for the formation of the homogeneous membrane.

To form an asymmetric membrane, a solution is cast as described hereinbefore, and thereafter the cast solution is partially cured to remove a portion of the solvent. Thereafter, one or both surfaces of the partially dried membrane is contacted with a water quench so as to form a thin, non-porous, discriminating layer on one or both sides of the membrane under conditions such that the solvent away from the dense layer communicates to the dense layer forming pores in the remainder of the membrane, thereby forming an asymmetric membrane. Such porous layer is present to provide support for the thin discriminating layer without impeding the transport of the fluid containing the components to be separated by the semi-permeable, thin discriminating layer. The partial curing step is performed in a manner similar to the curing step described with respect to the formation of homogeneous membranes.

Flat sheet, tubular, and hollow fiber membranes can be formed by extrusion from an appropriate solution of the polycarbonate in a solvent. Such spinning is well known to those skilled in the art, and the formation of hollow fibers which are homogeneous, asymmetric, or composite membranes requires the adaptation of the hereinbefore described procedures to the hollow fiber form of the membrane. Such adaptations are well within the skill of the art. A preferred extrusion process for such membranes is disclosed in U.S. Pat. No. 4,772,392, the relevant portions incorporated herein by reference.

Preferably, the thin discriminating layer in a composite or asymmetric form of a membrane has a thickness of between about 0.02 and about 10 microns, more preferably between about 0.02 and about 2 microns. Preferably, the supporting layer in a composite or asymmetric form of a membrane possesses a thickness of between about 5 and about 500 microns, more preferably between about 10 and about 200 microns.

In one preferred embodiment, the membranes are annealed before use. It is believed that annealing increases the separation factor. The membrane is exposed to elevated temperatures below the glass transition temperature for a period of time to partially densify the polymer. This procedure may optionally be performed under vacuum. For tetrabromobisphenol A, temperatures between about 30° and about 250° C. are preferred, more preferably between about 50° and about 230° C.

The membranes are fabricated into flat sheet, spiral, tubular, or hollow fiber devices by methods known in the art. The membranes are sealingly mounted in a pressure vessel in such a manner that the membrane separates the vessel into two fluid regions wherein fluid flow between the two regions is accomplished by fluid permeating through the membrane. Under certain conditions, it may be highly desirable to provide support to the membrane when the membrane is employed in a separation apparatus or process. In one embodiment, the peripheral area of the membrane is affixed to a framing structure which supports the outer edge of the membrane. The membrane can be affixed to the framing structure by a clamping mechanism, adhesive, chemical bonding, or other techniques known in the prior art. The membrane affixed to the frame can then be sealingly engaged in the conventional manner in a vessel so that the membrane surface inside the framing support separates two otherwise non-communicating compartments in the vessel. The skilled artisan will recognize that the structure which supports the membrane can be an integral part of the vessel or even the outer edge of the membrane. The membrane divides a separation chamber into two regions, a higher pressure side and a lower pressure side. One side of the membrane is contacted with the feed gas mixture under pressure, while a pressure differential is maintained across the membrane. The hydrogen in the gas mixture selectively passes through the membrane more rapidly than the other components in the gas mixture. Gas which is enriched in hydrogen is thus obtained on the low pressure side of the membrane as permeate. Gas depleted in hydrogen is obtained on the high pressure side of the membrane which is removed from the high pressure side of the membrane as non-permeate.

This invention is a process for separating hydrogen from gas mixtures containing gases such as nitrogen, carbon monoxide, carbon dioxide and light hydrocarbons in addition to hydrogen. The process comprises contacting a feed gas stream containing hydrogen with the membrane hereinbefore described under conditions such that hydrogen selectively permeates through the membrane in comparison to the other components. As used herein, the term light hydrocarbons refers to gaseous saturated and unsaturated $C_{1-4}$ hydrocarbons. The process is carried out at pressures and temperatures which do not deleteriously affect the membranes. Preferably, the pressure on the high pressure side of the membrane is between about 35 psig (about 241 kPa) and about 2000 psig (about 13,780 kPa), more preferably between about 100 psig (about 689 kPa) and about 1000 psig (about 6890 kPa). The pressure differential across the membrane is preferably between about 15 psig (about 103 kPa) and about 1500 psig (about 10,335 kPa), and more preferably between about 50 psig (about 344 kPa) and about 500 psig (about 3,445 kPa). The temperature at which the feed gas stream is contacted with the membrane is preferably between about 0° and 150° C., more preferably between about 5° and 100° C. In one preferred embodiment, the membrane is in a hollow fiber form. In the embodiment wherein the membrane is in hollow fiber form, the feed gas mixture may be introduced on the outside or inside of the hollow fiber.

Gas permeability is defined as $$P = \frac{(\text{amount of permeate})(\text{membrane thickness})}{(\text{area})(\text{time})(\text{driving force across the membrane})}$$

A standard permeability measurement unit is the Barrer (Ba), which is equal to $$10^{-10} \frac{(\text{centimeter}^3 \text{ (STP)}) (\text{centimeter})}{(\text{centimeter})^2 (\text{second}) (\text{centimeter Hg})}$$

abbreviated hereinafter as $$\text{abbreviated hereinafter as } 10^{-10} \frac{\text{cm}^3 (\text{STP}) \text{ cm}}{\text{cm}^2 \text{ s cm Hg}}$$

The reduced flux is defined as (permeability)÷(membrane thickness). A standard reduced flux unit is $$10^{-6} \frac{(\text{centimeter})^3 (\text{STP})}{(\text{centimeter})^2 (\text{second}) (\text{centimeter Hg})}$$

abbreviated hereinafter as $$10^{-6} \frac{\text{cm}^3 (\text{STP})}{\text{cm}^2 \text{ s cm Hg}}$$

The separation factor (selectivity) is defined as the ratio of the permeability or flux of the faster permeating gas to the permeability or flux of the slower permeating gas.

The membranes useful in this invention for hydrogen/light hydrocarbon separation preferably possess a separation factor for hydrogen/light hydrocarbons at about 25° C. of at least about 25, more preferably of at least about 50. The membranes useful in this invention for hydrogen/nitrogen separation preferably possess a separation factor for hydrogen/nitrogen at about 25° C. of at least about 15, more preferably of at least about 40.

The membranes useful in this invention preferably have a reduced flux for hydrogen of at least about $10^{-5}$ cm$^3$(STP)/(cm$^2$sec cmHg) or greater, more preferably of about $10^{-4}$ cm$^3$(STP)/(cm$^2$sec cmHg) or greater. The membrane preferably possesses a permeability for hydrogen of at least about 5 Ba, more preferably of at least about 10 Ba. The membrane separation process of this invention may be combined with non-membrane separation processes such as cryogenics (low temperature distillation) and pressure swing adsorption.

SPECIFIC EMBODIMENTS

The following Examples are included for illustrative purposes only and are not intended to limit the scope of the Claims or the invention.

EXAMPLE 1

Tetrabromobisphenol A Polycarbonate Film Tests

A solution containing about 18 weight percent tetrabromobisphenol A polycarbonate (TBBA-PC) in dichloromethane is prepared. The solution is cast onto a glass plate and the solvent allowed to evaporate for about 1 hour. The film is removed from the glass plate. Excess solvent is allowed to evaporate from the membrane at atmospheric conditions overnight. Subsequently, the film is placed in a vacuum oven at about 120° to about 140° C. for at least about 3 days to remove residual solvent. The film is about 0.16 millimeters thick.

A disc of approximately 1.5 inch diameter is cut from the film and placed in a constant-volume/variable-pressure gas permeation test apparatus. For details regarding this permeability measurement technique, see Pye, Hoehn, and Panar, "Measurement of Gas Permeability of Polymers, I. Permeabilities in Constant-Volume/Variable-Pressure Apparatus," *Journal of Applied Polymer Science*, Vol. 20, 1976, pp. 1921-1931, the relevant portions incorporated herein by reference. Pure gas at a pressure of about 100 psig and about 35° C. are fed to one side of the film and the amount of gas permeating through the membrane measured. Separation factor and permeability data are reported in Table I.

TABLE I

| SINGLE GAS TESTING OF TBBA-PC FILM | | | |
|---|---|---|---|
| Permeability (Barrers) | Separation Factor | | |
| $H_2$ | $H_2/CH_4$ | $H_2/C_2H_4$ | $H_2/C_2H_6$ |
| 16.3 | 150 | 108 | 380 |

EXAMPLE 2

Tetrabromobisphenol A Polycarbonate Hollow Fiber Tests

Hollow fibers are extruded from an extrusion blend containing about 52.0 weight percent tetrabromobisphenol A polycarbonate (TBBA-PC), about 32.6 weight percent N-methylpyrrolidinone, and about 15.4 weight percent tetraethylene glycol as described in U.S. Pat. No. 4,772,392, the relevant portions incorporated herein by reference. The fibers are fabricated into test units and the single gas permeabilities measured at a feed pressure of about 50 psig and a temperature of about 35° C. Data are reported in Table II.

TABLE II

| SINGLE GAS TESTING OF TBBA-PC FIBERS | | | |
|---|---|---|---|
| $\left( \dfrac{\text{Gas Flux}}{\text{cm}^2 \text{ S cmHg}} \right)$ cm$^3$ (STP) | Separation Factor | | |
| $H_2$ | $H_2/CH_4$ | $H_2/C_2H_4$ | $H_2/C_2H_6$ |
| 12.9 | 120 | 53 | 194 |

EXAMPLE 3

Tetrabromobisphenol A Polycarbonate Annealed Hollow Fiber Tests

Hollow fibers of TBBA-PC are extruded as described in Example 2. The fibers are annealed at about 90° C. for 4 days. Single gas fluxes are measured at a feed pressure of about 50 psig and a temperature of about 35° C. Data are shown in Table III. Annealing increases the gas separation factor significantly while decreasing the gas flux.

TABLE III

| $\left( \dfrac{\text{Gas Flux}}{\text{cm}^2 \text{ S cmHg}} \right)$ cm$^3$ (STP) | Separation Factor | | | |
|---|---|---|---|---|
| $H_2$ | $H_2/CH_4$ | $H_2/C_2H_4$ | $H_2/C_2H_6$ | $H_2/N_2$ |
| unannealed 22.2 × 10$^{-5}$ | 104.4 | 60.9 | 205.9 | 83.8 |
| annealed 7.11 × 10$^{-5}$ | 114.2 | 73.2 | 433.6 | 106.3 |

EXAMPLE 4

Tetrabromobisphenol A Polycarbonate Hollow Fiber Temperature Dependence Tests

Hollow fibers of TBBA-PC are extruded as described in Example 2. The fibers are annealed at about 90° C. for 4 days. Single gas fluxes are measured at a feed pressure of about 50 psig and a temperature of about 15°, 35°, 50° and 80° C., respectively. Data are shown in Table IV.

TABLE IV

| Temperature (°C.) | $\left( \dfrac{\text{Gas Flux}}{\text{cm}^2 \text{ S cmHg}} \right)$ cm$^3$ (STP) $H_2$ | Separation Factor | | | |
|---|---|---|---|---|---|
| | | $H_2/CH_4$ | $H_2/C_2H_4$ | $H_2/C_2H_6$ | $H_2/N_2$ |
| Unannealed | | | | | |
| 15 | 17.4 × 10$^{-5}$ | 134.0 | 55.4 | 198.5 | 111.9 |
| 35 | 22.2 × 10$^{-5}$ | 104.4 | 60.9 | 205.9 | 83.8 |
| 50 | 26.2 × 10$^{-5}$ | 86.5 | 58.4 | 214.1 | 79.8 |
| 80 | — | — | — | — | — |

TABLE IV-continued

| Temperature (°C.) | Gas Flux ($\frac{cm^3 (STP)}{cm^2 \, S \, cmHg}$) $H_2$ | Separation Factor | | | |
|---|---|---|---|---|---|
| | | $H_2/CH_4$ | $H_2/C_2H_4$ | $H_2/C_2H_6$ | $H_2/N_2$ |
| Annealed | | | | | |
| 15 | $5.08 \times 10^{-5}$ | 182.4 | 89.2 | 664.7 | 116.8 |
| 35 | $7.11 \times 10^{-5}$ | 114.2 | 73.2 | 433.7 | 106.2 |
| 50 | $9.46 \times 10^{-5}$ | 107.5 | 73.0 | 341.9 | 96.5 |
| 80 | $13.0 \times 10^{-5}$ | 65.1 | 58.4 | 192.6 | — |

What is claimed is:

1. A process of separating hydrogen from gas mixtures comprising:
(A) contacting one side of a semi-permeable membrane with a feed gas mixture containing hydrogen under pressure, wherein the membrane divides a separation chamber into a higher pressure side into which the feed gas mixture is fed and a lower pressure side;
(B) maintaining a pressure differential across the membrane under conditions such that hydrogen selectively permeates through the membrane from the high pressure side to the low pressure side of the membrane;
(C) removing from the low pressure side of the membrane permeated gas which is enriched in hydrogen; and
(D) removing from the high pressure side of the membrane non-permeated gas which is depleted in hydrogen wherein the membrane comprises a thin discriminating layer consisting predominantly of a polycarbonate polymer derived from a bisphenol corresponding to Formula I:

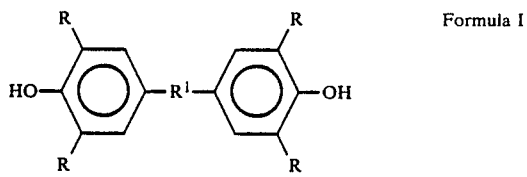

Formula I wherein R at each occurrence is independently hydrogen, chlorine, bromine, or $C_{1-4}$ alkyl and $R^1$ is —CO—, —S—, —SO2—, —O—, or a $C_{1-6}$ divalent hydrocarbon radical, with the proviso that at least about 25 weight percent of the moieties derived from the bisphenol of Formula I present in the discriminating layer bear R groups which are exclusively bromine or chlorine, wherein said membrane possesses a separation factor between hydrogen and light hydrocarbons of at least about 50 at a temperature of approximately 25° C., and wherein said membrane is characterized by a separation factor between hydrogen and methane of at least about 100 at a temperature of approximately 35° C.

2. The process of claim 1 wherein at least about 35 weight percent of the moieties derived from the bisphenol of Formula I present in the discriminating layer bear R groups with which are exclusively bromine or chlorine.

3. The process of claim 2 wherein at least about 50 weight percent of the moieties derived from the bisphenol of Formula I present in the discriminating layer bear R groups which are exclusively bromine or chlorine.

4. The process of claim 3 wherein $R^1$ is a $C_{1-6}$ divalent hydrocarbon radical.

5. The process of claim 4 wherein the remainder of the moieties derived from the bisphenol of Formula I present in the discriminating layer bear R groups which are exclusively $C_{1-4}$ alkyl.

6. The process of claim 3 wherein the thin discriminating layer consists predominantly of a polycarbonate polymer derived from between about 50 and about 100 weight percent of a bisphenol of Formula III:

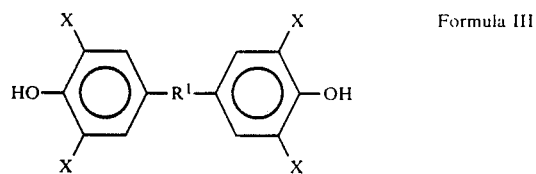

Formula III and between about 0 and about 50 weight percent of a bisphenol of Formula IV:

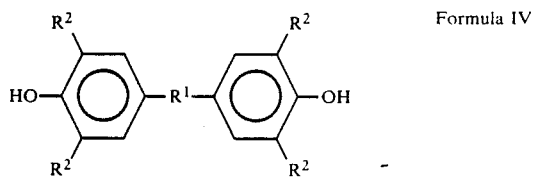

Formula IV wherein
$R^1$ is a $C_{1-6}$ divalent hydrocarbon radical;
$R^2$ is $C_{1-4}$ alkyl; and
X is chlorine or bromine.

7. The process of claim 6 wherein $R^2$ is methyl.

8. The process of claim 3 wherein about 100 weight percent of the moieties derived from Formula I present in the discriminating layer bear R groups which are exclusively bromine or chlorine.

9. The process of claim 8 wherein at least about 50 weight percent of the moieties derived from Formula I present in the discriminating layer bear R groups which are exclusively bromine.

10. The process of claim 2 wherein at least about 35 weight percent of the moieties derived from Formula I present in the discriminating layer bear R groups which are exclusively bromine, wherein the separation factor for hydrogen and light hydrocarbons at about 25° C. is at least about 25.

11. The process of claim 10 wherein the permeability of hydrogen is at least about 5 Ba.

12. The process of claim 11 wherein the reduced flux of hydrogen is at least about $$10^{-5} \frac{cm^3 \, (STP)}{cm^2 \, sec \, cm \, Hg}$$

13. The process of claim 12 wherein at least about 50 weight percent of the moieties derived from Formula I bear R groups which are exclusively bromine.

14. The process of claim 13 wherein the remainder of the R groups are $C_{1-4}$ alkyl and $R^1$ is a $C_{1-6}$ divalent hydrocarbon radical.

15. The process of claim 14 wherein the remainder of the R groups are methyl and $R^1$ is a $C_{1-6}$ alkylidene moiety.

16. The process of claim 13 wherein about 100 weight percent of the moieties derived from the Formula I bear R groups which are exclusively bromine.

17. The process of claim 16 wherein $R^1$ is a $C_{1-6}$ divalent hydrocarbon radical.

18. The process of claim 17 wherein the bisphenol is tetrabromobisphenol A.

19. The process of claim 10 wherein the feed pressure is between about 35 and about 2000 psig.

20. The process of claim 10 wherein the feed gas mixture has a temperature during the contacting between about 0° and abut 150° C.

21. The process of claim 1 wherein said membrane is annealed at a temperature between about 30° and 250° C. before said contacting.

22. The process of claim 21 wherein said membrane posses separation factors between hydrogen and light hydrocarbons and between hydrogen and nitrogen of at least approximately 50 and 40, respectively, at a temperature of about 25° C., and wherein said membrane is characterized by a separation factor between hydrogen and methane of at least about 110 at a temperature of approximately 35° C.

* * * * *